(12) United States Patent
Sokolov et al.

(10) Patent No.: US 10,887,339 B1
(45) Date of Patent: Jan. 5, 2021

(54) SYSTEMS AND METHODS FOR PROTECTING A CLOUD STORAGE AGAINST SUSPECTED MALWARE

(71) Applicant: Symantec Corporation, Mountain View, CA (US)

(72) Inventors: Ilya Sokolov, Boston, MA (US); Lei Gu, Bedford, MA (US); Mark Kennedy, Gardena, CA (US)

(73) Assignee: NORTONLIFELOCK, INC., Tempe, AZ (US)

( * ) Notice: Subject to any disclaimer, the term of this patent is extended or adjusted under 35 U.S.C. 154(b) by 168 days.

(21) Appl. No.: 16/142,270

(22) Filed: Sep. 26, 2018

(51) Int. Cl.
*H04L 29/06* (2006.01)
*G06F 21/55* (2013.01)
*G06F 21/56* (2013.01)

(52) U.S. Cl.
CPC .......... *H04L 63/145* (2013.01); *G06F 21/554* (2013.01); *G06F 21/565* (2013.01); *G06F 2221/033* (2013.01)

(58) Field of Classification Search
CPC ...... G06F 21/56; G06F 21/554; G06F 21/565; G06F 2221/033; H04L 63/145
See application file for complete search history.

(56) References Cited

U.S. PATENT DOCUMENTS

| 10,142,357 | B1 * | 11/2018 | Tamersoy | ........... H04L 63/1425 |
| 2008/0141373 | A1 * | 6/2008 | Fossen | ................. H04L 63/145 726/23 |
| 2015/0067860 | A1 * | 3/2015 | Levow | .................. H04L 63/145 726/24 |
| 2015/0186641 | A1 * | 7/2015 | Cabrera | ................ G06F 21/554 726/23 |
| 2016/0232349 | A1 * | 8/2016 | Baeder | .................. G06F 21/561 |

* cited by examiner

*Primary Examiner* — Yogesh Paliwal
(74) *Attorney, Agent, or Firm* — FisherBroyles, LLP

(57) ABSTRACT

The disclosed computer-implemented method for protecting a cloud storage against suspected malware may include (1) receiving a backup of one or more encrypted files over a network, (2) determining that the one or more encrypted files match one or more criteria associated with suspected malware, and (3) performing a security action that protects a computing device against the suspected malware. Various other methods, systems, and computer-readable media are also disclosed.

18 Claims, 7 Drawing Sheets

SYSTEMS AND METHODS FOR PROTECTING A CLOUD STORAGE AGAINST SUSPECTED MALWARE

BACKGROUND

The risk of incurring online security threats, such as malware attacks, is ever-growing on an increasing variety of user computing devices that connect to the Internet. For example, the operating systems for many mobile computing devices have restrictions against installing robust security software capable of detecting sophisticated malware attacks on these devices. Similarly, many Internet of Things (IoT) devices may not provide any security protection at all, thereby making these devices susceptible to even the most basic malware attacks. Moreover, some users of client devices that are capable of running robust security solutions may choose not to utilize security software for any number of reasons (e.g., the belief that installing the software will slow down their computing devices or that their default protection is sufficient). As a result, systems have been developed to move malware detection from user computing devices and onto remote cloud-based servers (i.e., "the cloud").

However, traditional systems for detecting malware on user computing devices in the cloud may often create a number of privacy risks for users. For example, traditional systems may only be able scan a user's files (e.g., email attachments) for malware if they are stored in the clear (e.g., in a readable format), thus potentially subjecting a user's personal information to be accessed by unauthorized parties.

SUMMARY

As will be described in greater detail below, the instant disclosure describes various systems and methods for protecting a cloud storage against suspected malware.

In one example, a computer-implemented method for protecting a cloud storage against suspected malware may include (1) receiving a backup of one or more encrypted files over a network, (2) determining that the one or more encrypted files match one or more criteria associated with suspected malware, (3) and performing a security action that protects a computing device against the suspected malware.

In some examples, performing the security action may include one or more of (1) flagging the one or more encrypted files for a reputation check upon a restore operation from the cloud storage, (2) generating a user notification for downloading an anti-malware solution, (3) changing a backup policy to maintain previous backups of the one or more encrypted files after a predetermined retention period, (4) changing the backup policy to store fewer revisions of the one or more encrypted files on the cloud storage, and (5) rejecting additional backups of the one or more encrypted files to the computing device. In some embodiments, the computing device may include a cloud storage server.

In some embodiments, determining that the one or more encrypted files match the criteria may include determining that a file size associated with the one or more encrypted files is close to a file size associated with known malware. Additionally or alternatively, determining that the one or more encrypted files match the criteria may include determining that the one or more encrypted files were uploaded to the computing device from a location associated with containing copies of malware. Additionally or alternatively, determining that the one or more encrypted files match the criteria may include determining that the one or more encrypted files were uploaded to the computing device during a time period associated with a known malware occurrence. Additionally or alternatively, determining that the one or more encrypted files match the criteria may include determining that a file type associated with the one or more encrypted files matches a file type associated with known malware. Additionally or alternatively, wherein determining that the one or more encrypted files match the criteria may include determining that a file header value associated with the one or more encrypted files matches a file header value associated with known malware. Additionally or alternatively, determining that the one or more encrypted files match the criteria may include determining that the backup of the one or more encrypted files matches a download sequence of a number of malware files and malware file types. Additionally or alternatively, determining that the one or more encrypted files match the criteria may include determining that the one or more encrypted files match multiple criteria associated with the suspected malware.

In one embodiment, a system for protecting a cloud storage against suspected malware may include at least one physical processor and physical memory that includes multiple modules and computer-executable instructions that, when executed by the physical processor, cause the physical processor to (1) receive, by a receiving module on a computing device, a backup of one or more encrypted files over a network, (2) determine, by a determining module, that the one or more encrypted files match one or more criteria associated with the suspected malware, and (3) perform, by a security module, a security action that protects the computing device against the suspected malware.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a backup of one or more encrypted files over a network, (2) determine that the one or more encrypted files match one or more criteria associated with suspected malware, and (3) perform a security action that protects the computing device against the suspected malware.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
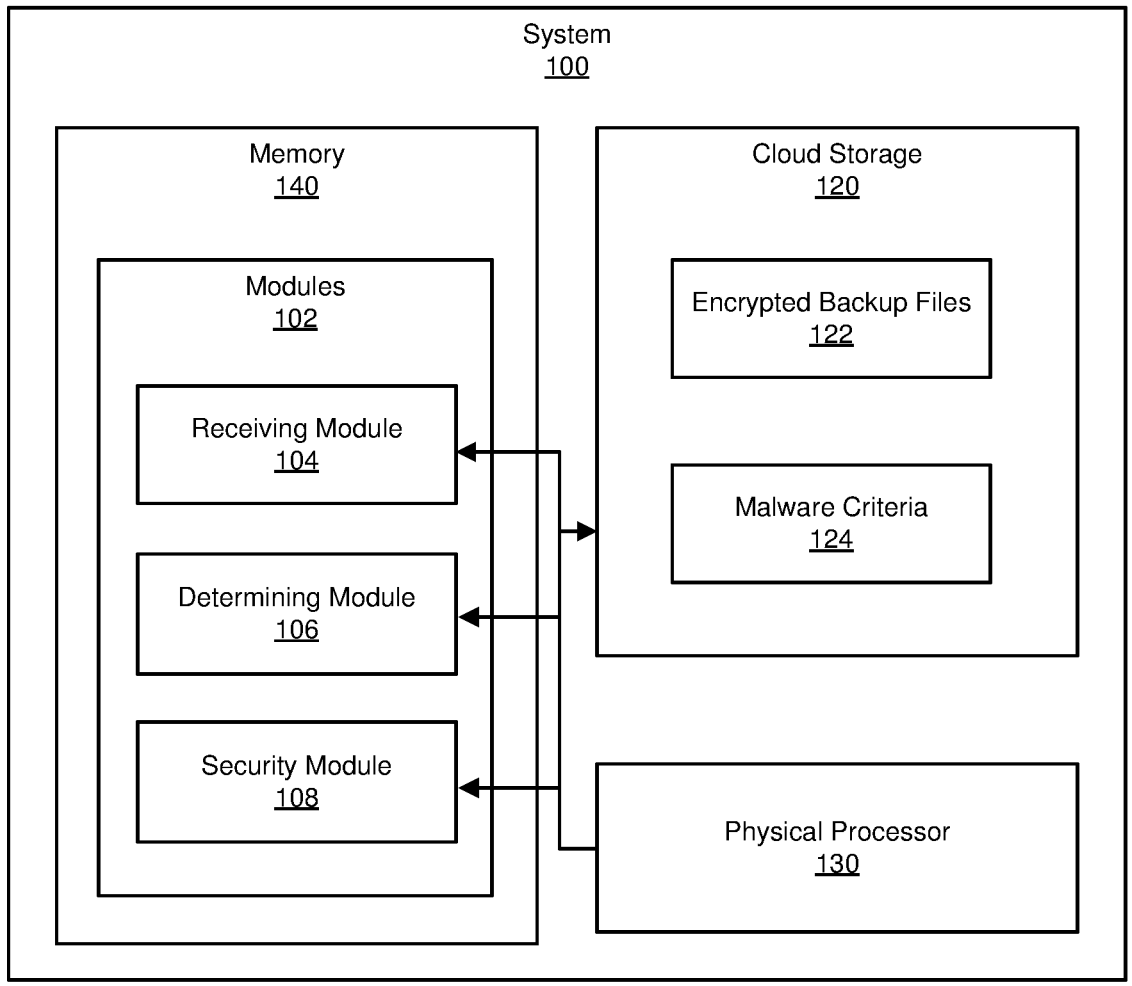
FIG. 1 is a block diagram of an example system for protecting a cloud storage against suspected malware.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for protecting a cloud storage against suspected malware. As will be explained in greater detail below, by evaluating encrypted files backed up on a cloud storage for various external file characteristics and processes associated with known malware, the systems described herein may identify potential malware infections without exposing the internal contents of the encrypted files (e.g., without decrypting the files) thereby protecting user privacy with respect to the encrypted file content.

In addition, the systems and methods described herein may improve the functioning of a computing device by reducing the computing device's susceptibility to malware attacks. For example, the systems described herein may identify suspicious computing device backup files stored on a cloud server and adjust a backup/restoration policy to prevent malware infection or reinfection during subsequent backup/restore operations on the computing device.

Figure 2:
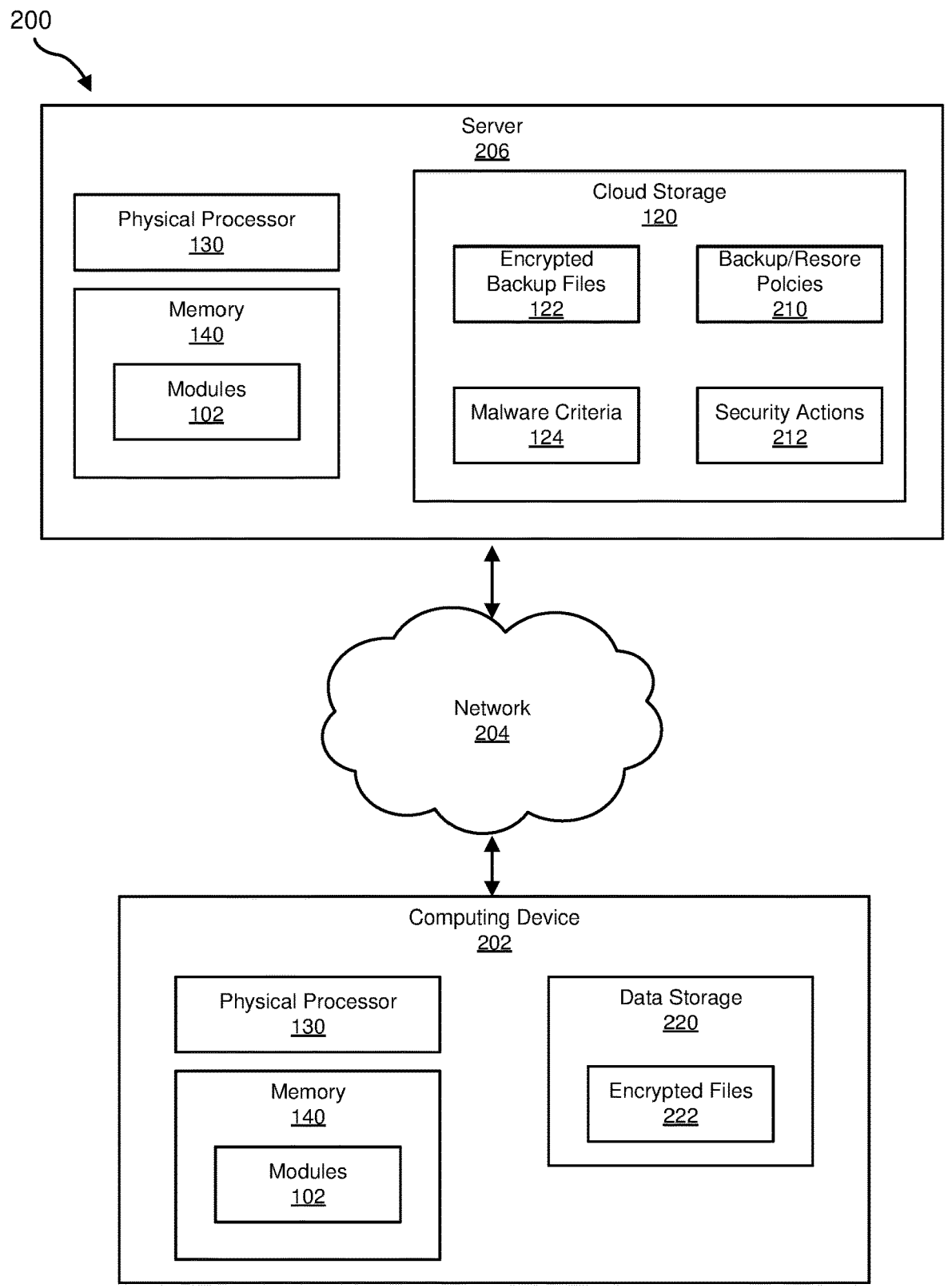
FIG. 2 is a block diagram of an additional example system for protecting a cloud storage against suspected malware.

The following will provide, with reference to FIGS. 1-2, detailed descriptions of example systems for protecting a cloud storage against suspected malware. Detailed descriptions of corresponding computer-implemented methods will also be provided in connection with FIG. 3. Detailed descriptions of example malware criteria in an example system for protecting a cloud storage against suspected malware and example security actions for protecting a cloud storage against suspected malware, will be provide in connection with FIGS. 4 and 5, respectively. In addition, detailed descriptions of an example computing system and network architecture capable of implementing one or more of the embodiments described herein will be provided in connection with FIGS. 6 and 7, respectively.

FIG. 1 is a block diagram of an example system 100 for protecting a cloud storage against suspected malware. As illustrated in this figure, example system 100 may include a receiving module 104 that receives a backup of one or more encrypted files over a network. Example system 100 may additionally include a determining module 106 that determines that one or more encrypted files match one or more criteria associated with suspected malware. Example system 100 may also include a security module 108 that performs a security action that protects a computing device against the suspected malware. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting a cloud storage against suspected malware. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a cloud storage 120. In one example, cloud storage 120 may be configured to store encrypted backup files 122 from a client computing device and malware criteria 124.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect a cloud storage against suspected malware.

Computing device 202 generally represents any type or form of computing device capable of reading computer-executable instructions. In some examples, computing device 202 may be a client device running data backup software for performing data backup and restore operations on a cloud server. Additionally, computing device 202 may also be configured to utilize the data backup software to encrypt data (e.g., files) prior to performing data backup operations. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. In some examples, server 206 may be a cloud server for performing data backup and restore operations for encrypted files 222 received from computing device 202, on cloud storage 120. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Cloud storage 120, on server 206, generally represents any type or form of data storage capable of storing files/and or data. In some examples, cloud storage 120 may be a backup storage medium for storing encrypted backup files 122, malware criteria 124, backup/restore policies 210, and security actions 212. The terms "encrypted backup files" and "encrypted files," as used herein, generally refers to any files that have had their contents encrypted such that the contents are not able to be identified or viewed without subsequent decryption. In some examples, encrypted backup files may represent files that have been encrypted by a file backup solution prior to the initiation of a file backup to a data storage. For example, encrypted backup files 122 may represent one or more backups of encrypted files 222 in data storage 220 on computing device 202. In some examples, encrypted backup files 122 may include one or more detectable attributes or features (e.g., file type, file size, non-secret portable executable (PE) file headers, etc.) that may be detectable without examining the encrypted file contents themselves.

The term "malware criteria" as used herein, generally refers to one or more metrics associated with the occurrence of previously detected or known malware. In some examples, one or more sets of malware criteria, either alone or in combination, may be applied to features or attributes associated with encrypted backup files to determine suspected malware.

Figure 3:
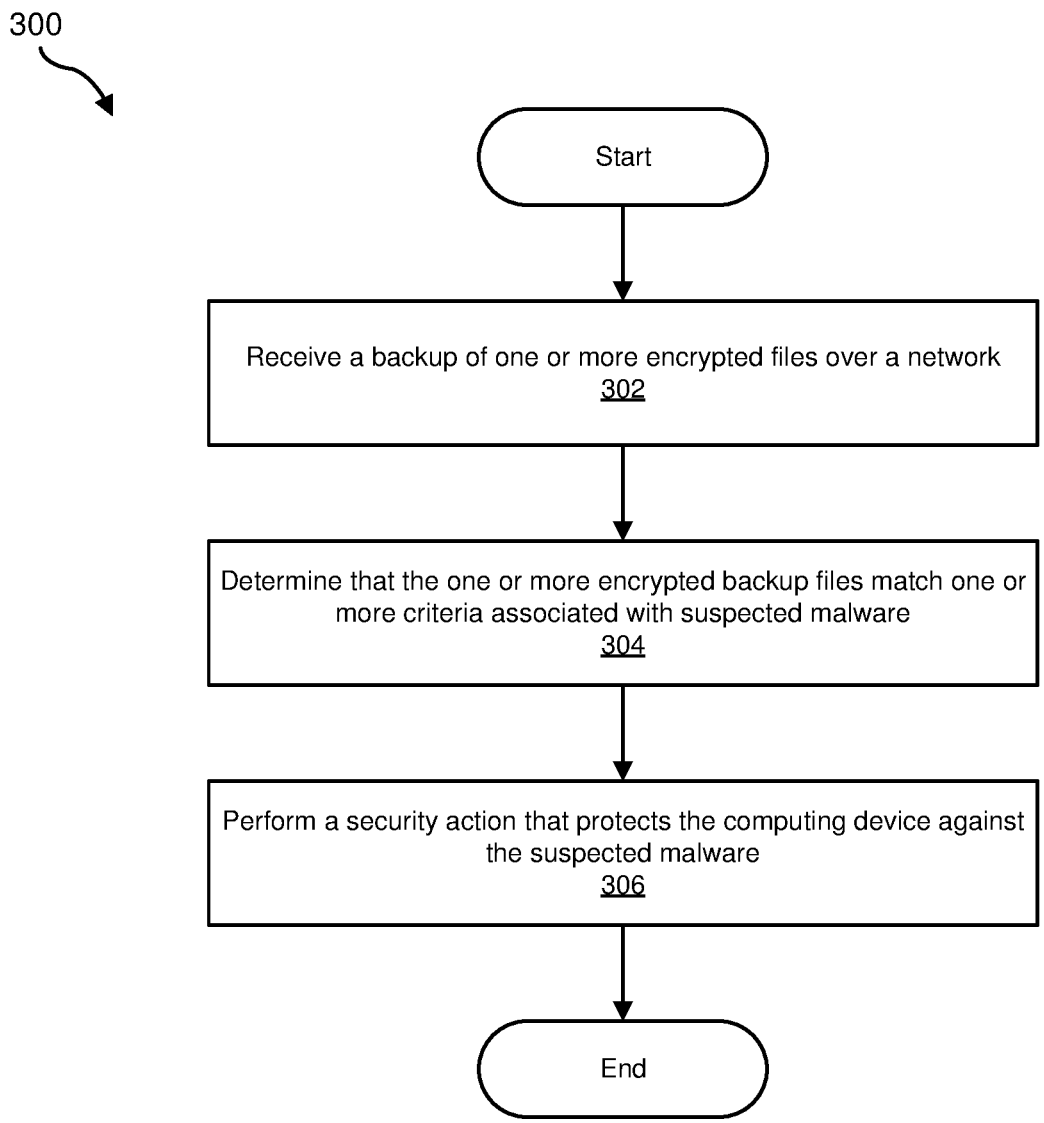
FIG. 3 is a flow diagram of an example method for protecting a cloud storage against suspected malware.

FIG. 3 is a flow diagram of an example computer-implemented method 300 for protecting a cloud storage against suspected malware. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a backup of one or more encrypted files over a network. For example, receiving module 104 may, as part of server 206 in FIG. 2, receive encrypted backup files 122 over network 204 in cloud storage 120.

Receiving module 104 may receive encrypted backup files 122 in a variety of ways. In some examples, receiving module 104 may receive encrypted backup files 122 as part of a backup operation of encrypted files 222 from computing device 202. In some embodiments, the backup operation may be initiated from server 206. In other embodiments, the backup operation may be initiated from computing device 202 (e.g., a client device).

At step 304, one or more of the systems described herein may determine that the one or more encrypted files match one or more criteria associated with suspected malware. For example, determining module 106 may as part of server 206 in FIG. 2, determine that encrypted backup files 122 match one or more of malware criteria 124 which will now be described with respect to FIG. 4.

Figure 4:
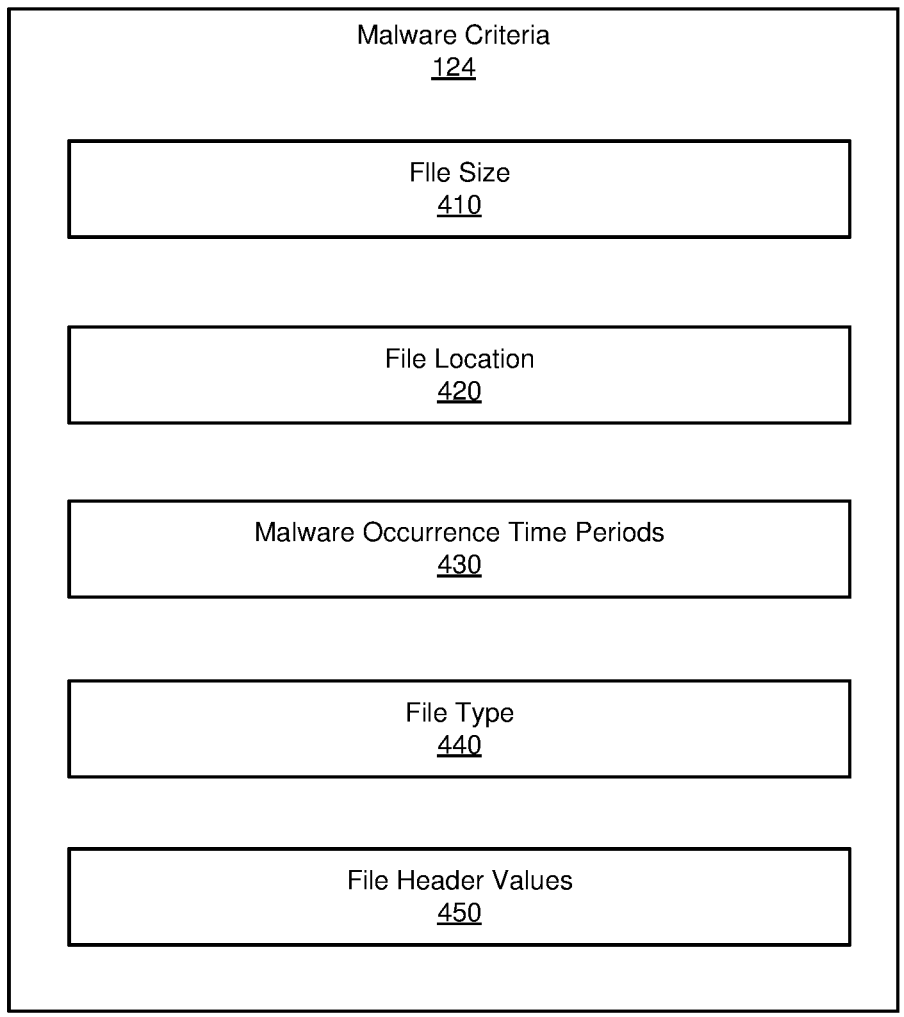
FIG. 4 is a block diagram of example malware criteria in an example system for protecting a cloud storage against suspected malware.

FIG. 4 is a block diagram of example malware criteria 124. As shown in FIG. 4, malware criteria 124 may include file size 410, file location 420, malware occurrence time periods 430, file type 440, and file header values 450.

In some examples, file size 410 may represent a file size (e.g., a file block size) associated with known malware files. File location 420 may represent a location of a folder (e.g., a system folder, a downloads folder, a temporary file folder, etc.) on computing device 202 from which backup encrypted files were uploaded (e.g., backed up) to cloud storage 120 on server 206. Malware occurrence time periods 430 may represent dates and/or times when a previously discovered malware outbreak occurred and spread throughout network 204. File type 440 may represent a type of file associated with previously discovered malware. File header values 450 may represent header values (e.g., non-secret portable executable (PE) header values) such as a number of file sections, file section sizes, file creation date, number of file imports, and/or number of file exports found in previously discovered malware.

Returning to step 304 of FIG. 3, determining module 106 may determine a match with malware criteria 124 in a variety of ways. In some examples, determining module 106 may compare a file size for each of encrypted backup files 122 with file size 410 in malware criteria 124 to determine if the file size of any encrypted backup files 122 is an exact match with or close to file size 410. For example, if determining module 106 determines that a file size of an encrypted backup file 122 is within the block size of a symmetric encryption block or an exact size match corresponding to a known malware payload size, then determining module 106 may determine that one or more of the encrypted backup files 122 contains suspected malware.

Additionally or alternatively, determining module 106 may compare an upload file location (e.g., on computing device 202) associated with encrypted backup files 122 with file location 420 in malware criteria 124 to determine a match. For example, if determining module 106 determines that one or more encrypted backup files 122 were uploaded from a system folder on computing device 202 that matches a system folder on computing device 202 where a discovered malware payload is typically copied, then determining module 106 may determine that one or more of the encrypted backup files 122 contains suspected malware.

Additionally or alternatively, determining module 106 may compare an upload date and/or time associated with an encrypted backup file 122 with malware occurrence time periods 430 in malware criteria 124 to determine a match. For example, if determining module 106 determines that one or more encrypted backup files 122 was uploaded on the same date when a discovered malware outbreak occurred, then determining module 106 may determine that one or more of the encrypted backup files 122 contains suspected malware.

Additionally or alternatively, determining module 106 may compare a file type associated with an encrypted backup file 122 with file type 440 in malware criteria 124 to determine a match. For example, if determining module 106 determines that one or more encrypted backup files 122 has the same file type as a discovered malware payload, then determining module 106 may determine that one or more of the encrypted backup files 122 contains suspected malware.

Additionally or alternatively, determining module 106 may compare file header values associated with an encrypted backup file 122 with file header values 450 in malware criteria 124 to determine a match. For example, if determining module 106 determines, after examining the file headers of encrypted backup files 122, that one or more encrypted backup files 122 has the same non-secret PE header values (e.g., the same number of sections, the same section sizes, the same PE creation date, the same number of imports, and/or the same number of exports) as those in discovered malware, then determining module 106 may determine that one or more of the encrypted backup files 122 contains suspected malware.

In some examples, determining module 106 may also determine that encrypted backup files 122 contain suspected malware by comparing file backup behavior associated with discovered malware to the backup of encrypted backup files 122. For example, if determining module 106 determines that discovered malware involved multiple downloads (e.g., an email containing a word processing document type that uses an embedded script to download another executable payload), determining module 106 may determine that encrypted backup files 122 contain suspected malware if the same number of files and file types were uploaded to cloud storage 120 on server 206 during a backup operation.

In some examples, determining module 106 may determine that one or more of encrypted backup files 122 contain suspected malware based on one or a combination of multiple criteria in malware criteria 124. For example, a file size or a file type for an encrypted backup file 122 may coincidentally match a file size or a file type associated with known malware and thus may not be infected. However, an encrypted backup file 122 having the same file size, file type, file location, and file header values as known malware may indicate a significant probability of an infection in an encrypted backup file 122.

At step 306 one or more of the systems described herein may perform a security action that protects the computing device against the suspected malware. For example, security module 108 may, as part of server 206 in FIG. 2, perform security actions 212 to protect server 206 and/or computing device 202 against the suspected malware determined at step 304.

Figure 5:
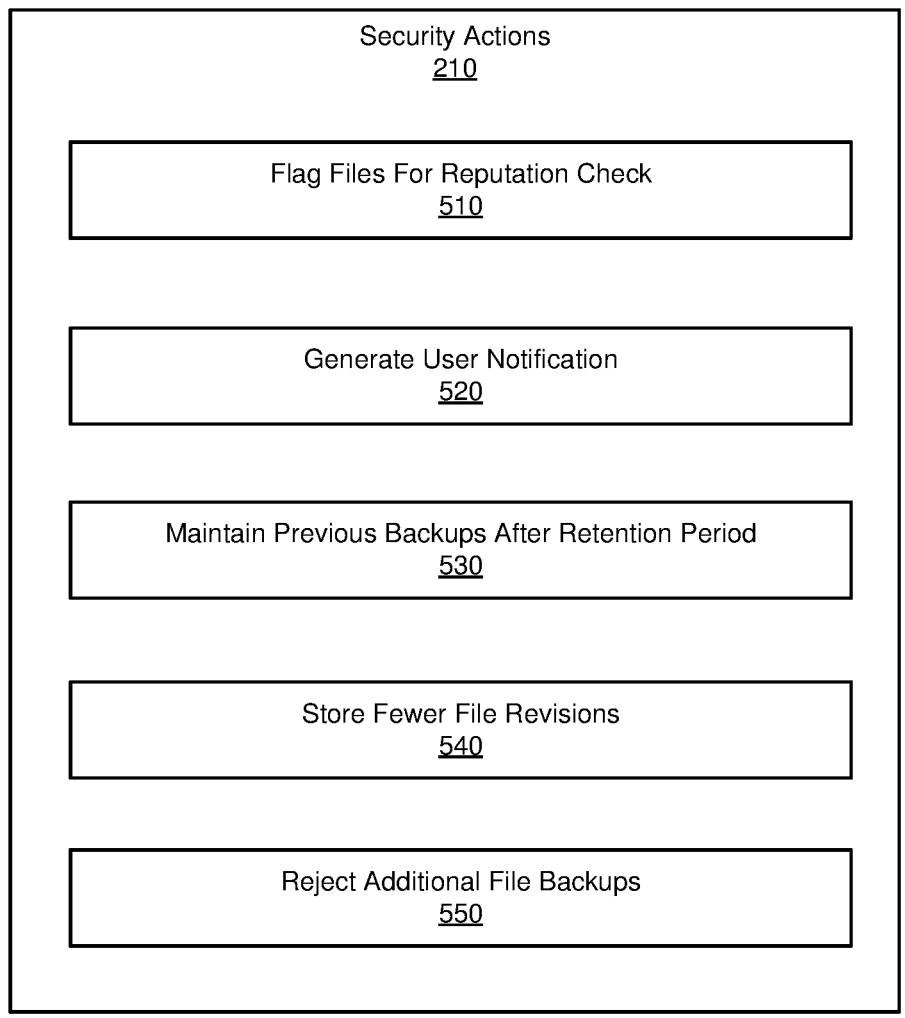
FIG. 5 is a block diagram of example security actions for protecting a cloud storage against suspected malware.

Security module 108 may perform security actions 212 in a variety of ways. In some examples, security module 108 may perform one or more of the security actions 212 shown in FIG. 5. For example, FIG. 5 is a block diagram of example security actions 212 for protecting a cloud storage (e.g., cloud storage 120) against suspected malware. In some examples, security actions 212 may include a flag files for reputation check action 510, generate a user notification action 520, maintain previous backups after retention period action 530, store fewer file revisions action 540, and/or reject additional backups action 550.

In some embodiments, security module 108 may perform flag files for reputation check action 510 by flagging any encrypted backup files 122 determined to contain suspected malware to prevent reinfection (e.g., when encrypted backup files 122 are restored to computing device 202 during a restore operation from cloud storage 120 on server 206). Additionally or alternatively, security module 108 may perform generate a user notification action 520 by sending a notification to a user of computing device 202 that one or more encrypted backup files 122 contain suspected malware suggesting threat protection solutions (e.g., anti-virus software) the user may download to prevent future infections.

Additionally or alternatively, security module 108 may perform maintain previous backups after retention period action 530 by changing backup/restore policies 210 on server 206 to maintain older backup revisions of encrypted backup files 122 for a longer than a default time period for maintaining file backups instead of purging these files after the default time period has elapsed. Additionally or alternatively, security module 108 may perform store fewer file revisions action 540 by storing fewer revisions of new file backups from computing device 202 to cloud storage 120 on server 206 as these files may also contain suspected malware. Additionally or alternatively, security module 108 may perform reject additional backups action 550 by rejecting any new uploads of encrypted files from computing device 202 to backup on cloud storage 120 as these files may also be suspected of containing malware.

As explained above in connection with example method 300, files stored on a client device may be encrypted prior to being backup on to a cloud storage to protect user privacy. In contrast to traditional cloud backup services that may scan the contents of a user's unencrypted backup files (e.g., to detect a thumbprint match) without accounting for user privacy concerns, the systems described herein may include a cloud backup application that examines features of encrypted files, without scanning the file contents, to identify the likelihood of a malware infection as well as potential impacted systems. The features examined by the cloud backup application may include, without limitation (1) determining whether an encrypted file size is about the size (e.g. within the block size of the symmetric encryption block or exact size match when GCM mode is used) of files associated with the discovered malware, (2) determining whether an encrypted file was uploaded from a standard client folder matching the location where discovered malware may typically place a copy, (3) determining whether a new encrypted file was uploaded around the same date when a discovered malware outbreak occurred, (4) determining whether a file type or any header values associated with an encrypted file match those of the discovered malware, and/or (5) if discovered malware involves downloading multiple files in a specific sequence, determining whether during the backup of the encrypted files, the same number of files and file types were uploaded in the same sequence. The threat detection application may further determine a significant likelihood of that a malware infection has occurred based on multiple instances of the above features being matched as a result of the examination of the encrypted backup files. Upon detecting a suspected malware infection, the cloud backup application may then flag any suspicious encrypted files for a reputation check during a restore operation (to prevent reinfection), suggest security products and/or upgrades for installation on the client device for malware detection and removal, and/or changing a backup policy for backing up encrypted files on the client device to the cloud storage.

Figure 6:
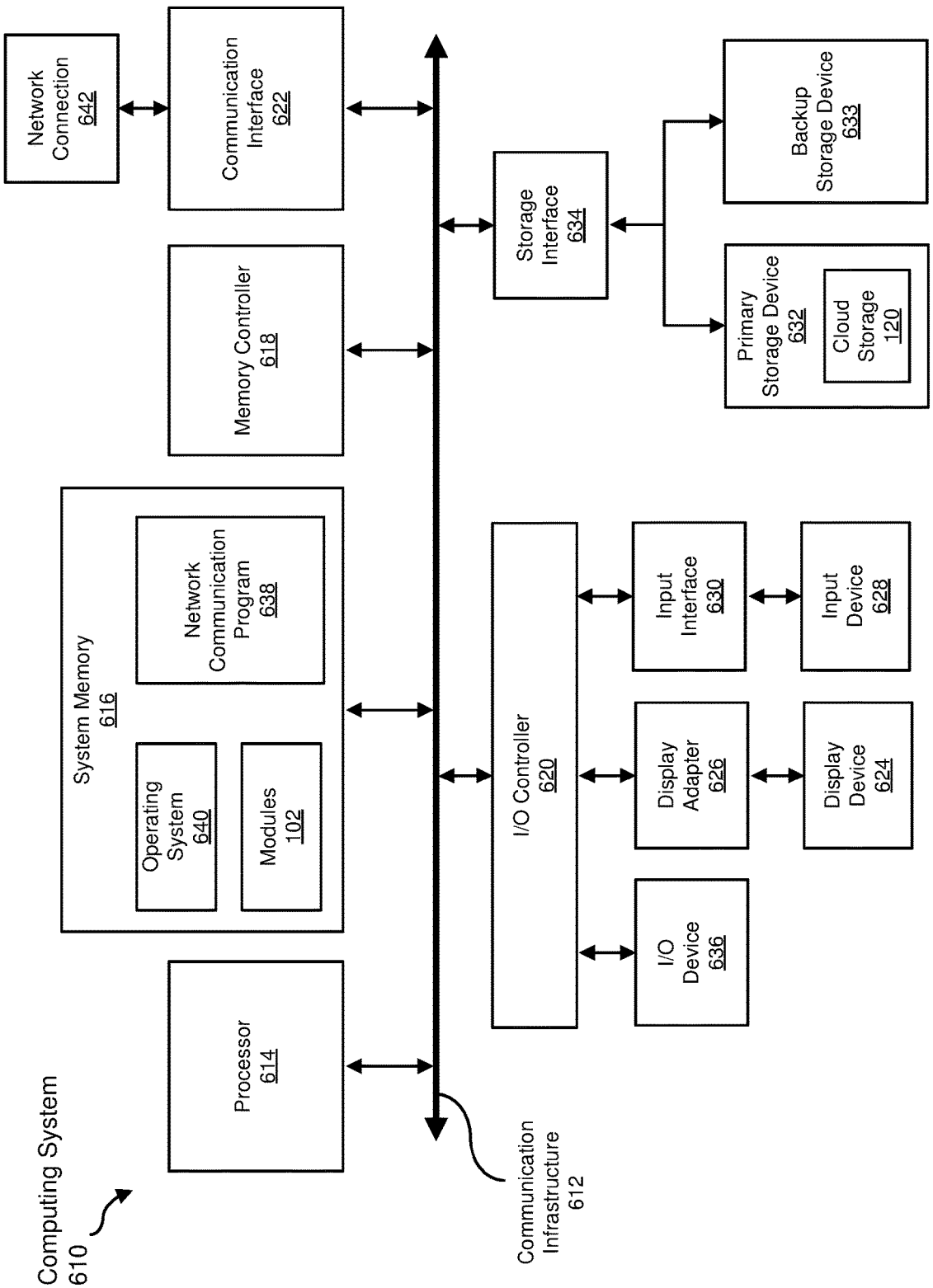
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, cloud storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
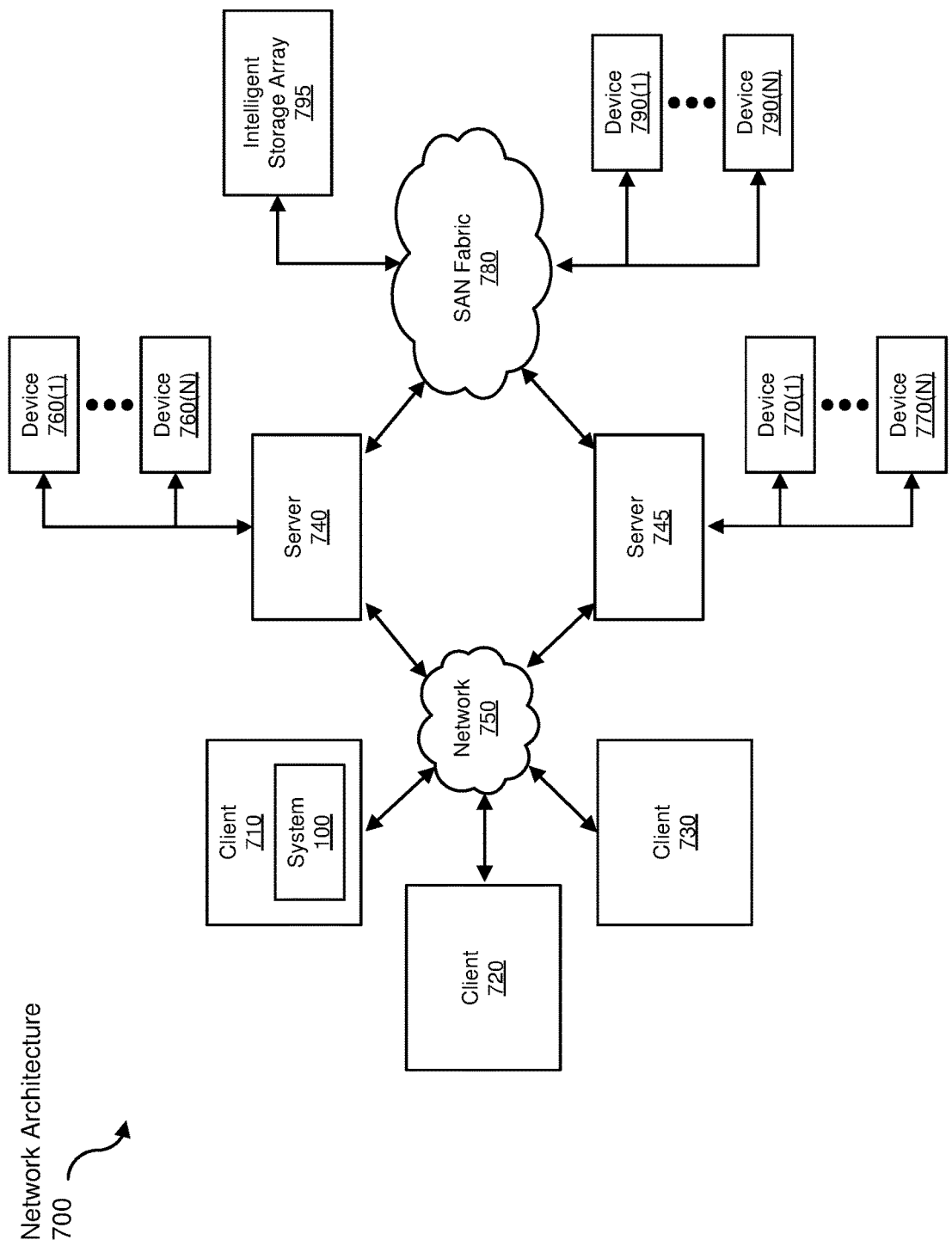
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting a cloud storage against suspected malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting a cloud storage against suspected malware, at least a portion of the method being performed by a computing device comprising at least one processor, the method comprising:
   receiving, by a computing device, a backup of one or more encrypted files over a network;
   determining, by the computing device, that the one or more encrypted files match one or more criteria associated with suspected malware, wherein determining that the one or more encrypted files match the criteria comprises determining that the backup of the one or more encrypted files matches a download sequence of a number of malware files and malware file types; and
   performing, by the computing device, a security action that protects the computing device against the suspected malware.

2. The computer-implemented method of claim 1, wherein performing the security action comprises at least one of:
   flagging the one or more encrypted files for a reputation check upon a restore operation from the cloud storage;
   generating a user notification for downloading an anti-malware solution;

changing a backup policy to maintain previous backups of the one or more encrypted files after a predetermined retention period;

changing the backup policy to store fewer revisions of the one or more encrypted files on the cloud storage; and rejecting additional backups of the one or more encrypted files to the computing device.

3. The computer-implemented method of claim 1, wherein determining that the one or more encrypted files match the criteria further comprises determining that a file size associated with the one or more encrypted files is a file size of an encrypted backup file that is within a file block size of a symmetric encryption file block.

4. The computer-implemented method of claim 1, wherein determining that the one or more encrypted files match the criteria further comprises determining that the one or more encrypted files were uploaded to the computing device from a location associated with containing copies of malware.

5. The computer-implemented method of claim 1, wherein determining that the one or more encrypted files match the criteria further comprises determining that the one or more encrypted files were uploaded to the computing device during a time period associated with a known malware occurrence.

6. The computer-implemented method of claim 1, wherein determining that the one or more encrypted files match the criteria further comprises determining that a file type associated with the one or more encrypted files matches a file type associated with known malware.

7. The computer-implemented method of claim 1, wherein determining that the one or more encrypted files match the criteria further comprises determining that a file header value associated with the one or more encrypted files matches a file header value associated with known malware.

8. The computer-implemented method of claim 1, wherein determining that the one or more encrypted files match the criteria further comprises determining that the one or more encrypted files match a plurality of the criteria associated with the suspected malware.

9. The computer-implemented method of claim 1, wherein the computing device comprises a cloud storage server.

10. A system for protecting a cloud storage against suspected malware, the system comprising:

at least one physical processor;

physical memory comprising a plurality of modules and computer-executable instructions that, when executed by the physical processor, cause the physical processor to:

receive, by a receiving module on a computing device, a backup of one or more encrypted files over a network;

determine, by a determining module, that the one or more encrypted files match one or more criteria associated with the suspected malware, wherein the determining module determines that the one or more encrypted files match the criteria by determining that the backup of the one or more encrypted files matches a download sequence of a number of malware files and malware file types; and perform, by a security module, a security action that protects the computing device against the suspected malware.

11. The system of claim 10, wherein the security module performs the security action by:

flagging the one or more encrypted files for a reputation check upon a restore operation from the cloud storage;

generating a user notification for downloading an anti-malware solution;

changing a backup policy to maintain previous backups of the one or more encrypted files after a predetermined retention period;

changing the backup policy to store fewer revisions of the one or more encrypted files on the cloud storage; and rejecting additional backups of the one or more encrypted files to the computing device.

12. The system of claim 10, wherein the determining module determines that the one or more encrypted files match the criteria by further determining that a file size associated with the one or more encrypted files is a file size of an encrypted backup file that is within a file block size of a symmetric encryption file block.

13. The system of claim 10, wherein the determining module determines that the one or more encrypted files match the criteria by further determining that the one or more encrypted files were uploaded to the computing device from a location associated with containing copies of malware.

14. The system of claim 10, wherein the determining module determines that the one or more encrypted files match the criteria by further determining that the one or more encrypted files were uploaded to the computing device during a time period associated with a known malware occurrence.

15. The system of claim 10, wherein the determining module determines that the one or more encrypted files match the criteria by further determining that a file type associated with the one or more encrypted files matches a file type associated with known malware.

16. The system of claim 10, wherein the determining module determines that the one or more encrypted files match the criteria by further determining that a file header value associated with the one or more encrypted files matches a file header value associated with known malware.

17. The system of claim 10, wherein the determining module determines that the one or more encrypted files match the criteria by further determining that the one or more encrypted files match a plurality of the criteria associated with the suspected malware.

18. A non-transitory computer-readable medium comprising one or more computer-executable instructions that, when executed by at least one processor of a computing device, cause the computing device to:

receive a backup of one or more encrypted files over a network;

determine that the one or more encrypted files match one or more criteria associated with suspected malware, wherein the one or more computer-executable instructions cause the computing device to determine that the one or more encrypted files match the criteria by determining that the backup of the one or more encrypted files matches a download sequence of a number of malware files and malware file types; and perform a security action that protects the computing device against the suspected malware.

* * * * *